Feb. 23, 1932.   F. R. KLAUS   1,846,118
METHOD OF CUTTING RIMS
Original Filed June 14, 1926   3 Sheets-Sheet 1
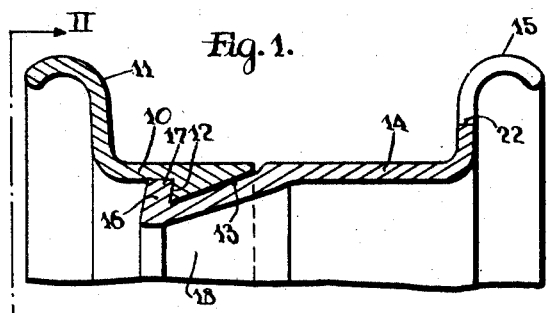
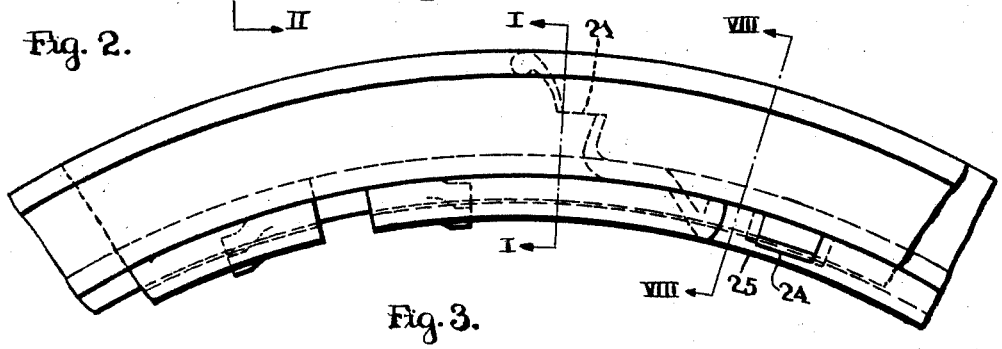
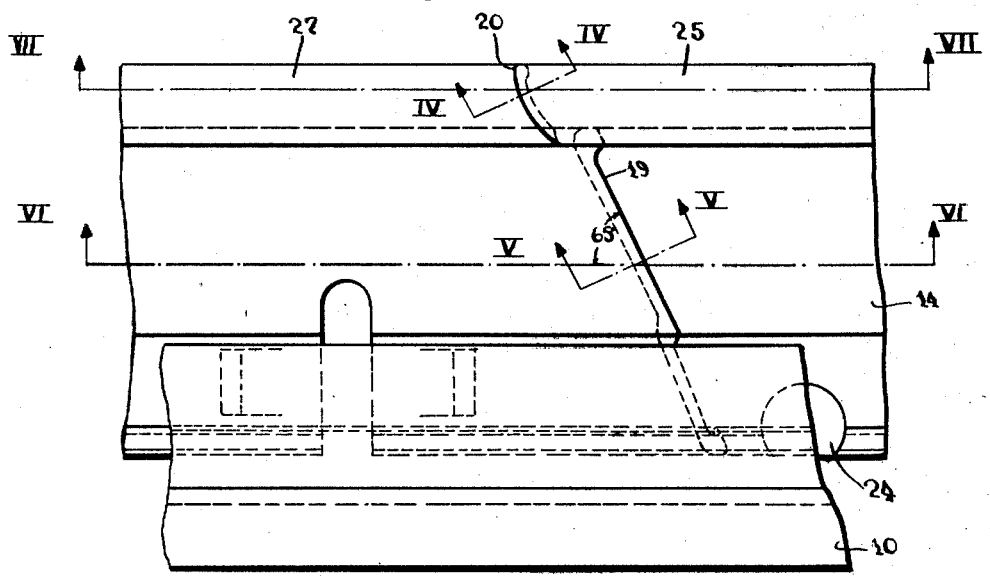
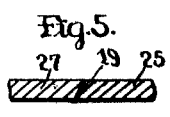
Inventor
Fred R. Klaus.
By
Attorney Feb. 23, 1932.    F. R. KLAUS    1,846,118
METHOD OF CUTTING RIMS
Original Filed June 14, 1926    3 Sheets-Sheet 2
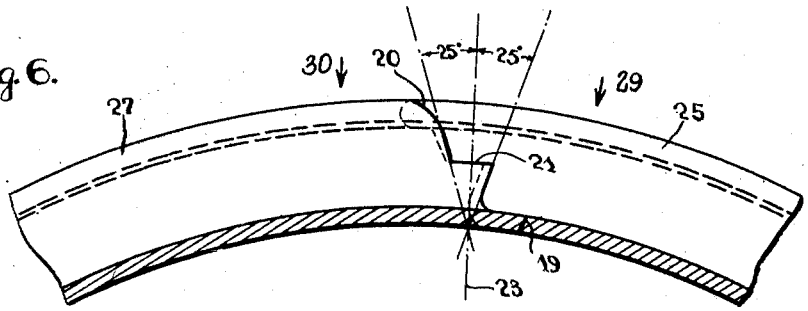
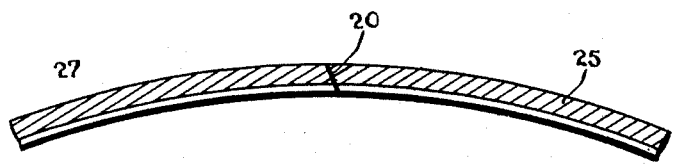
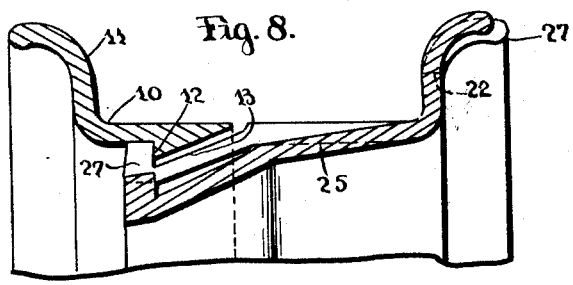
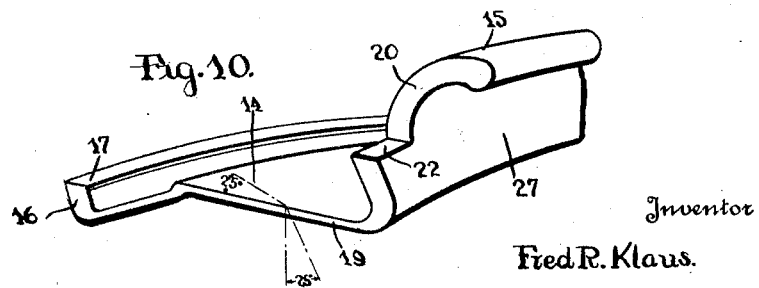
Inventor
Fred R. Klaus.
By
Attorney Feb. 23, 1932.  F. R. KLAUS  1,846,118
METHOD OF CUTTING RIMS
Original Filed June 14, 1926  3 Sheets-Sheet 3

Inventor
Fred R. Klaus.

By

Attorney

Patented Feb. 23, 1932

1,846,118

UNITED STATES PATENT OFFICE

FRED R. KLAUS, OF WARREN, OHIO, ASSIGNOR, BY MESNE ASSIGNMENTS, TO THE GOODYEAR TIRE & RUBBER COMPANY, OF AKRON, OHIO, A CORPORATION OF OHIO

METHOD OF CUTTING RIMS

Original application filed June 14, 1926, Serial No. 115,838, and in Czechoslovakia and Great Britain May 23, 1927. Divided and this application filed July 24, 1928, Serial No. 295,106. Renewed May 29, 1930.

This invention relates to transversely split tire carrying rim structures of the demountable type and particularly to rim structures embodying a transversely split base portion adapted to interlock with an endless side member.

This application is a division of application Serial Number 115,838, filed June 14, 1926.

One object of the invention is to provide a method of making a transverse split, in a rim of the character designated, that is of such form as to cause the abutting end portions of the split rim element to interlock against relative radial and lateral movement and that will also insure alignment of the end portions at all times while the rim is in assembled condition, regardless of distortions of the rim, without the use of supplemental fastening means, such as the conventional form of securing plates now customarily used on certain rims of large size.

Other objects of the invention and advantages to be obtained from using the invention, will be apparent to those skilled in the art from a consideration of this specification and the appended drawings wherein:

Figure 1 is a transverse sectional view of a rim assembly embodying this invention and taken substantially on line I—I of Figure 2 of the drawings;

Figure 2 is a lateral side view of the assembled rim structure shown in Fig. 1, looking in the direction of the arrows II—II;

Figure 3 is a plan view of the face of the rim assembly, with parts broken away, showing the transverse split in the rim as it appears when the rim is in assembled condition;

Figure 4 is a fragmentary sectional view, taken substantially on line IV—IV of Figure 3 and looking in the direction of the arrows, of a portion of the transverse split formed in the side flange of the rim and illustrating a preferred angularity of the transverse cut at this point relative to the face of the rim flange;

Figure 5 is a fragmentary sectional view of the transversely split rim member, taken substantially on line V—V of Figure 3, showing the angularity of the transverse cut to the face of the rim;

Figure 6 is a sectional view of the transplit rim member, taken substantially on line VI—VI of Figure 3, looking in the direction of the arrows;

Figure 7 is a fragmentary circumferential sectional view of the top of the side flange of the transversely split rim element, taken substantially on line VII—VII of Figure 3 and illustrating the angularity of the transverse cut at this point relative to the circumferential curvature of the rim;

Figure 8 is a transverse sectional view of the rim assembly taken substantially on line VIII—VIII of Figure 2, showing the rim in partial disassembled condition, one portion of the rim being sprung inwardly preparatory to disassembling the rim structure;

Figure 10 is an end view, shown in perspective, of one of the abutting ends of the transversely split rim element, the remainder of the rim assembly being removed or broken away.

Figure 9:
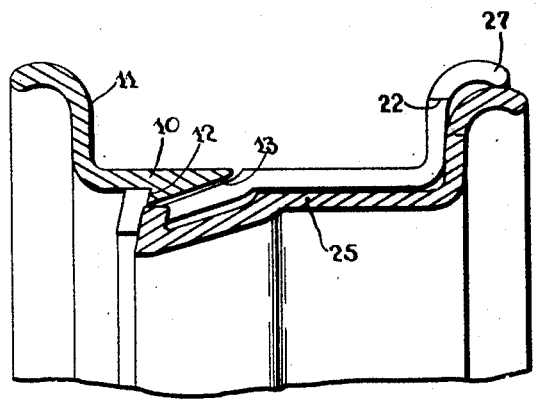
Figure 9 is a transverse sectional view of the rim, corresponding to Figure 8, with one end of the split rim moved radially inwardly and laterally with respect to its assembled condition.

A rim constructed in accordance with this invention embodies an endless rim member 10 that has a tire retaining flange 11 formed along one edge portion and a radially inwardly extending annular shoulder 12 formed along the other edge portion, the inner face 13 of the shoulder being of frusto conical form.

The endless rim member 10 interlocks with a transplit rim member 14 to provide a complete rim assembly. The transplit rim member 14 has an annular tire retaining flange 15 formed along one edge portion thereof and, along the other edge portion, has a gutter, the outer wall 16 of which has an inclined inner face and a peripheral seating face 17 that is adapted to engage the inner side of the endless rim member 10. The gutter of the transplit rim member is adapted to receive the inwardly extending annular shoulder 12 of the endless member 10 to positively interlock the rim members in their assembled relation. A frusto conical seating face for the rim assembly is formed on the radially inner face 18 of the transplit rim member 14. A rim of this general construction but having a transverse split of different character and a different form of endless rim element is shown and claimed in my Patent No. 1,590,762 issued June 29, 1926.

The feature of novelty that constitutes the principal subject matter of the claims of this application, is the particular character of the transverse split that is formed in the base member 14, and the cooperating relation of the endless rim member and the transplit rim member when the transverse split is of the character described.

The transverse split of the rim member 14 comprises three distinct portions, one of which is referred to as 19, and extends through and diagonally across the base of the rim member to a position substantially midway of the tire retaining flange 15. This portion of the split is formed at an angle to the radius lines of the rim drawn to the edges of the split and is also arranged to extend diagonally across the rim. A second portion 20 of the split extends inwardly from the outer edge of the flange 15 to substantially the same level as the termination of the portion 19 of the split. The portion 20 of the split extends in the same general diagonal direction as the portion 19, although in an oppositely inclined radial direction, the radial angularity preferably being about the same for the portions 19 and 20 of the split. These two elements of the split are joined by a third circumferentially extending portion 21 that provides a circumferential shoulder or seat 22 that is preferably positioned within the side wall of the flange 15.

The preferred angularity of the different portions of the split is defined by relating the plane of the split to the median line of the face of the rim assembly and to an arbitrarily selected radius line extended to some portion of the split. The degree of angularity may vary over a wide range depending upon the particular character of rim with which it is intended to be used. The angularities given are preferred for a 32x6 passenger car tire.

The portion 19 of the split that lies in the tire seating face of the rim is preferably formed in a plane that is inclined at an angle of about 25° relative to a reference radius line 23 of the wheel that extends to one edge of the split as shown in Fig. 6. The split extends diagonally across the face of the rim at an angle of about 65° with reference to the median line of the rim face as shown in Figure 3. This provides a portion 19 of the split that is radially inclined and that also extends diagonally across the face of the rim. The radial inclination of the portion 19 of the split is intended to facilitate the relative inward movement of one edge portion of one of the abutting end portions of the transplit rim member 14 during disassembly of the rim and to interlock the abutting rim ends against relative radial movement in one direction. The angularity of the split in the rim relative to the chosen reference radius of the rim and also relative to the median line of the rim face is determinated by the conditions most suitable for the particular type and size of rim to which the invention is applied, typical radial and diagonal inclinations being given merely as illustrative of suitable angular differences between the direction of the particular portion of the transverse split and the median plane of the rim and a reference radius of the rim drawn to one edge of the cut.

The portion 20 of the split extends in the same general transverse direction as regards angularity with respect to the median line of the rim face as does the portion 19 of the transverse split. The general direction of the plane forming the transverse split 20 in the outer edge portion of the rim flange 15 preferably is somewhat less, in certain rim sizes, than the angularity of the portion 19 of the split with respect to the median line of the rim face in order to facilitate disassembly of the rim. The angularity between these two portions of the cut is so chosen as to provide a rim in which one of the abutting ends may be most readily sprung inwardly about the circumferential shoulder 22 and moved laterally the thickness of the wall of the flange 15 without having any binding between the abutting portions defining the split 20. This position of the rim parts is shown in Figure 8. The difference in angularity of these elements of the split may vary over a widge range with due regard for the strength of the interlocking portions of the rim flange.

The portion 21 of the split is formed in the flange 15 and preferably extends circumferentially of the rim in a plane parallel with the axis of the rim. The elements of the split thus formed of primary importance are the provision of an interlocking connection between the abutting portions of the side flange 15, the provision of a circumferential seat 22 in the rim flange and the transverse angularity of sufficient degree to facilitate assembly and disassembly of the rim parts. Having thus described the general form of transverse split in the rim, the method of manufacture of the rim will next be described. After the separate rim parts 10 and 14 are formed and sized, the rim part 14 is then transversely split by sawing transversely through the base portion of the rim member at the desired angularity chosen for the particular type of rim being manufactured, the cut extending completely through the base portion of the member 14 and only partially through the side flange 15. A second cut is then formed in the side flange 15 at the desired angle and spaced the desired distance from the termination of the first cut. The rim member is then placed in a shearing machine and the metal connecting the terminations of the two saw cuts thus formed is sheared to provide the circumferential portion 21 of the split. This operation completely severs the rim 14 and provides a split of the desired character. Although this method of manufacture is preferred, any other suitable method of manufacture of a rim of this character could be satisfactorily used.

The disassembly of the rim structure is quickly and conveniently performed by inserting any suitable tool within the tool recess 24 and prying the gutter edge of the end portion 25 radially inward a sufficient degree to clear the annular interlocking shoulder 12, and laterally a sufficient degree to unseat the end porton 25 from the circumferential shoulder 22. When the edge of the rim end 25 is pried radially inward, it pivots on the circumferential shoulder 22, as shown in Figure 8. The lateral movement of the rim end unseats the rim flange from the shoulder 22. The rim parts then take the position shown in Figure 9. Since rims of this character are generally formed of mild steel, the inherent resiliency of the rim member 14 permits considerable distortion of the rim without imparting a permanent strain to the metal and without exerting great force.

Movement of the rim laterally slightly more than the lateral thickness of the flange 15 causes the outer edge of the end 25 of the transplit member to disengage the shoulder 22 and spring radially inwardly, thereby preventing the unintentional return of the end portion 25 to its seated position. This enables the operator to obtain a new purchase with the operating tool and to quickly completely disassemble the rim structure. This feature of the rim insures a very quick and convenient disassembly of the rim parts.

Figure 11:
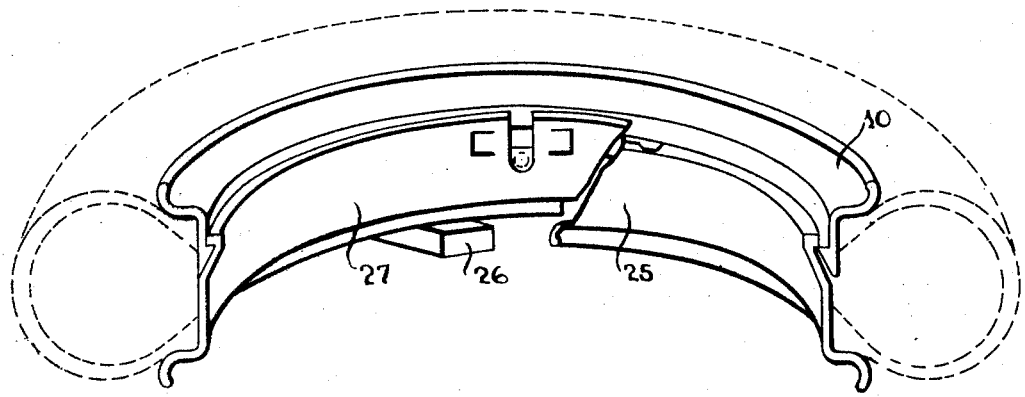
Figure 11 is a side elevational view of the rim parts illustrating a method of assembling the structure.

In the assembly of the rim parts, one method is to place the transplit rim member 14 flat on the floor with a block 26 inserted under the end portion 27, as shown in Figure 11. The tire is placed on the transplit member and the endless rim member 10 is hooked over the gutter wall of the raised end portion 27 of the transplit base member with the annular shoulder 12 of the endless member partially interlocked with the gutter of the transplit member. Pressure is then applied to the opposite side of the endless member. The conical or wedge shaped face 13 of the endless member, being of somewhat greater radius at its inner edge than the radius of the face of the gutter wall, assists in the operation of assembling the endless member over the transplit member, thus causing progressively more and more of the annular shoulder 12 to be received within the interlocking gutter of the transplit member. After the endless member is thus forced into place over a large portion of the gutter wall of the transplit member, the block 26 is removed and pressure is applied to the remaining unseated portion of the endless member and to an opposite point of the transplit member. The final seating of the end 25 of the transplit member is produced by kicking the rim flange radially outward and downward at the same time to move the end portion 25 over the shoulder 22 of the flange. It will be found that when the rim is forced together in this manner, the parts very readily assemble themselves without the need of a very great degree of force even when the rim is of relatively large size.

The rim parts may also be assembled by first placing the endless ring 10 on the floor, mounting the tire on the ring 10, then hooking the outer gutter wall of the end portion 27 over the annular flange 12 of the endless ring and pressing the transplit member down against the wedging face 13 of the endless member to progressively interlock more and more of the gutter wall with the annular shoulder 12. The end portion 25 of the rim is the last to be interlocked in place and this is done by delivering a blow radially outward and downward to the edge of the end 25 which springs the end portion 25 over the circumferential shoulder 22 and completes the assembly of the rim structure.

If the rim becomes distorted in use or is left in a partially assembled condition by one unfamiliar with rims of this character, the pressure of air in the tire and the expansive action of the cone shaped face of the felloe automatically cause the rim parts to seat themselves properly, thus overcoming the dangers formerly arising from deformed transplit rims and from carelessness in assembling rim structures of the previously proposed types. It will therefore be seen that the rim elements tend to automatically adjust themselves because of the particular angularity of the transverse cut, the shoulder 22 and the relation of the inclined gutter wall to the inwardly extending tire flange.

A rim of this character has many additional advantages over previously proposed rim structures. The rim is of very light weight and yet very substantial. The positive interlocking of the abutting ends of the transplit rim member against both radial and lateral displacement without the need of a supplemental locking device is of material importance. The abutting ends of the transplit rim member are also positively locked against unintentional disassembly. The transplit member can only be released from the endless member by twisting one end about the seating shoulder formed in the opposite flange. Such twisting operation can never result from an excessive blow or other abnormal strains because of the protection afforded on one side by the endless member 10 and on the other side by the shoulder 22.

The shoulder 22 also greatly facilitates disassembly of the rim by so interlocking the partially disassembled rim parts as to enable the operator to get a new purchase with the tool being used to disassemble the rim, at a critical point in the disassembly operation without having the rim structure reassemble itself after its disassembly is well started. The only tool necessary in the handling of a rim structure of this character is a screw driver or other convenient tool that can be used to pry one edge portion of the rim radially inwardly a sufficient degree to clear the shoulder 12 of the endless member. A very small force will generally suffice.

The rigidity of the rim in the zone of the split is of particular importance. The shoulder 22 resists any blows imposed on the end portion 25, such, for instance, as the blow in the direction of the arrow 29 shown in Figure 6. The radial inclination of the portion 19 of the split serves to resist radial blows in the direction of the arrow 30. Any lateral misalignment of the abutting ends of the transplit member is prevented by the interlocking of the gutter wall with the annular flange 12. This cooperative relation of the rim elements provides a rim structure of great rigidity.

It will be obvious to those skilled in the art that various modifications in the particular angularity and the relation of the parts of the transverse split and of the inclination and height of the gutter wall may be made without departing from the spirit of the invention. I desire, therefore, that this invention be limited only by the prior art relating to rims of this general character.

What I claim is:

1. The process of forming a transplit rim member that consists in forming a cut through the rim base and only partially through one side flange of the rim member, forming a second cut through a portion only of the side flange circumferentially spaced from the first cut, and subsequently shearing the metal intermediate the two cuts to provide a split extending completely across the rim.

2. The process of forming a transplit rim member, having a tire retaining flange along one edge thereof that consists in forming a cut diagonally across the base portion of said member at an angle to the radii of the member extending to the cut, said cut extending completely through the base and only partially through the tire retaining flange, forming a second cut through the tire retaining flange in the same general diagonal direction as the first named cut but with an opposed angularity relative to the radii of the rim extending to the cut, the terminus of the second cut being circumferentially spaced from the terminus of the first named cut, and shearing the connecting metal of the flange between the termini of the two cuts thereby transversely completely severing the rim member.

3. The process of forming a transplit rim member having a tire retaining flange along one edge thereof, that consists in forming a cut diagonally across the base portion of said member, said cut extending completely through the base and only partially through the tire retaining flange, forming a second cut through the tire retaining flange in a direction laterally of the rim and circumferentially spaced from the first cut, and subsequently shearing the metal intermediate the two cuts to provide a split extending completely across the rim.

4. The process of forming a transplit rim member having a tire retaining flange along one edge thereof, that consists in forming a cut diagonally across the base portion of said member, at an angle to the radii of the member extending to the cut, said cut extending completely through the base and only partially through the tire retaining flange, forming a second cut through the tire retaining flange in a direction laterally of the rim and circumferentially spaced from the first cut, and subsequently shearing the metal intermediate the two cuts to provide a split extending completely across the rim.

5. The process of forming a transplit rim member having a tire retaining flange along one edge thereof, that consists in forming a cut diagonally across the base portion of said member, said cut extending completely through the base and only partially through the tire retaining flange, forming a second cut diagonally through the tire retaining flange in a direction laterally of the rim and circumferentially spaced from the first cut, and subsequently shearing the metal intermediate the two cuts to provide a split extending completely across the rim.

6. The process of forming a transplit rim member having a tire retaining flange along one edge thereof, that consists in forming a cut diagonally across the base portion of said member, at an angle to the radii of the member extending to the cut, said cut extending completely through the base and only partially through the tire retaining flange, forming a second cut diagonally through the tire retaining flange in a direction laterally of the rim and circumferentially spaced from the first cut, and subsequently shearing the metal intermediate the two cuts to provide a split extending completely across the rim.

7. The process of forming a transplit rim member which comprises sawing the rim from one side, and subsequently sawing the rim from the opposite side and in a direction out of alignment with the part of the split formed in the first sawing operation and thereafter connecting the sawed splits by a shearing operation.

8. A process of forming a split in a rim having a tire-engaging flange, which comprises sawing the rim from opposite sides, with each cut extending partially through the rim and to the tire-engaging flange, and then connecting the ends of the cuts by a cut in the tire-engaging flange formed by shearing in a direction substantially axially of the rim.

In witness whereof, I have hereunto signed my name.

Signed at Warren in the county of Trumbull and State of Ohio, this 19th day of July, 1928.

FRED R. KLAUS.